Figure 1:
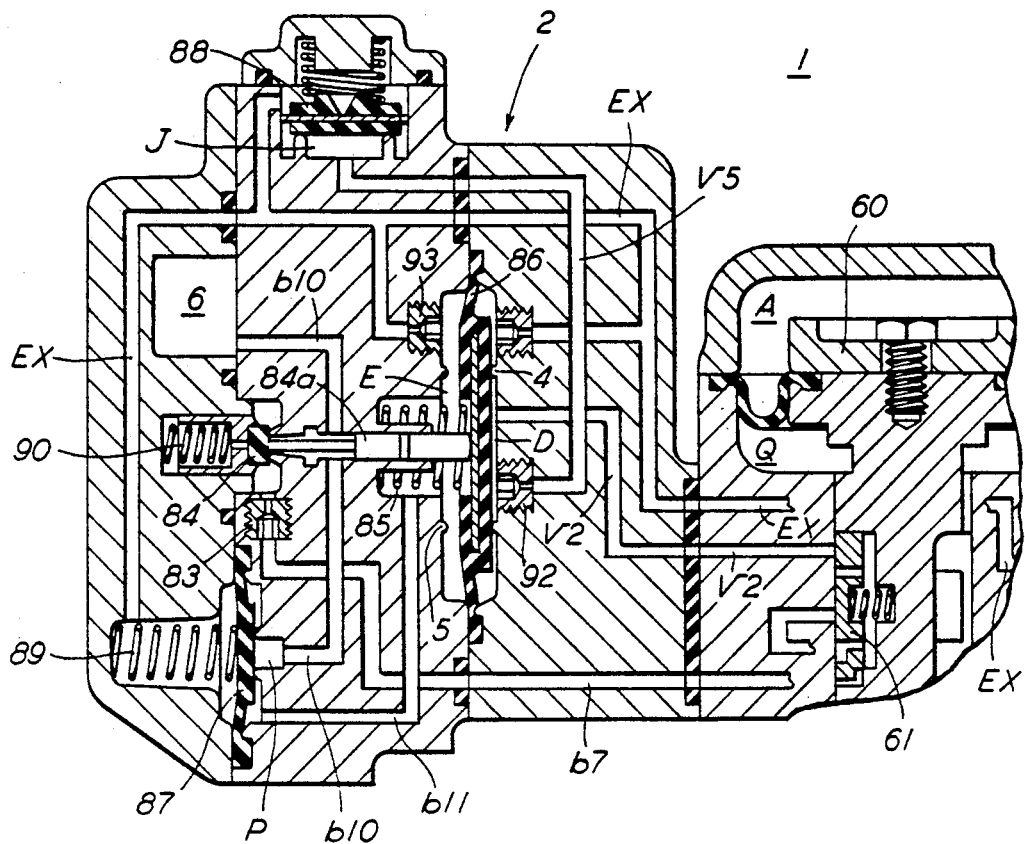

United States Patent
Panebianco

[11] Patent Number: 5,118,166
[45] Date of Patent: Jun. 2, 1992

[54] QUICK SERVICE FUNCTION FOR RAILWAY FREIGHT BRAKE CONTROL VALVE DEVICE

[75] Inventor: Fredrick Panebianco, Greensburg, Pa.

[73] Assignee: Westinghouse Air Brake Company, Wilmerding, Pa.

[21] Appl. No.: 695,841

[22] Filed: May 6, 1991

[51] Int. Cl.⁵ .................. B60T 11/34; B60T 17/04
[52] U.S. Cl. ............................. 303/82; 303/38; 303/81; 303/86; 303/36
[58] Field of Search .................. 303/35, 36, 37, 38, 303/39, 40, 64, 66, 70, 73, 74, 77, 80, 82, 81, 86, 83, DIG. 5, DIG. 6

[56] References Cited
U.S. PATENT DOCUMENTS

| | | | |
|---|---|---|---|
| 3,369,847 | 2/1968 | Lee | 303/70 |
| 3,407,009 | 10/1968 | Racki | 303/80 X |
| 3,716,276 | 2/1973 | Wilson et al. | |
| 4,653,812 | 3/1987 | Engle | 303/81 X |

*Primary Examiner*—Douglas C. Butler
*Attorney, Agent, or Firm*—J. B. Sotak

[57] ABSTRACT

An accelerated application valve having a cyclic mode of operation during one phase of which a local quick service reduction of brake pipe pressure occurs and a steady state mode of operation during which a continuous local quick service reduction of brake pipe pressure is achieved. The specific mode of operation is dictated by a control signal that varies with the degree of service brake application called for, this control signal being the "breather" pressure at the ABD/ABDW Control Valve emergency portion.

12 Claims, 1 Drawing Sheet

QUICK SERVICE FUNCTION FOR RAILWAY FREIGHT BRAKE CONTROL VALVE DEVICE

BACKGROUND OF THE INVENTION

In recognition for the need to improve braking performance in modern day railroad freight trains, due to the advent of longer heavier cars, a continuous quick service feature was introduced in the ABDW Control Valve Device manufactured by the Westinghouse Air Brake Company. This improved version of the well-known predecessor ABD Control Valve incorporates a continuous quick service feature in an emergency portion, that is totally compatible with existing ABD Control Valves, and which includes an integrated accelerated application valve that provides the continuous quick service function.

In supplementing the quick service reduction of brake pipe pressure typically obtained in the service portion of ABD/ABDW Control Valves, the additional local reduction of brake pipe pressure obtained throughout the full service reduction period by this continuous acting accelerated application valve significantly decreases brake application times and consequently shortens train stopping distances.

The accelerated application valve portion includes a diaphragm operated control piston that is piloted by back pressure developed from the quick action chamber breather pressure. This breathing of quick action chamber pressure is the means by which the emergency piston is normally stabilized during service braking. Depending upon the rate of service reduction of brake pipe pressure, the control valve breathing pressure initiates a cycling action during which brake pipe pressure is alternately supplied to a volumetric chamber and thence is exhausted to obtain a continuous controlled local venting of brake pipe pressure. As is well-known the cycling rate and thus the degree of local quick service venting of brake pipe pressure obtained by this accelerated application valve increases as the rate of brake pipe reduction increases, it being desirable to supplement the initial, one-shot quick service obtained by the service valve to a greater degree when a heavy service application is called for than during light service applications.

The aforementioned continuous quick service feature incorporated in the ABDW Control Valve is covered in U.S. Pat. No. 3,716,276.

SUMMARY OF THE INVENTION

The object of the present invention is to enhance the braking performance of ABDW Control Valves, by intensifying the local reduction of brake pipe pressure provided by the accelerated application valve.

It is an extension of this objective to provide an accelerated application valve having a steady state operating mode and a cyclic operating mode.

A further extension of the foregoing objective is to provide a continuous local exhaust of brake pipe pressure in the steady state or non-cyclic mode of operation and a periodic local exhaust of brake pipe pressure during a cyclic mode of operation.

A still further extension of the foregoing objectives is to provide an accelerated application valve having a dual mode operating characteristic the particular mode of operation of which is determined by the rate of service reduction of brake pipe pressure.

A final object of the invention is to achieve the foregoing by modifying the present standard ABDW accelerated application valve in a simple, low-cost manner.

According to the present invention, there is provided a brake pipe, a control piston having a first control chamber on its one side subject to a first control pressure and a second control chamber on its opposite side subject to a second control pressure, a first passage between the brake pipe and the control chamber, a supply valve in the first passage operable to an open position and a closed position in response to movement of the control piston to an application position and a release position respectively, a quick service bulb in the first passage between the supply valve and the second chamber, check valve means in the first passage between the quick service bulb and the second chamber for interrupting fluid pressure communication therebetween until such time as the pressure effective in said quick service bulb exceeds a predetermined value, a second passage connected to the first passage at a location between the quick service bulb and the check valve means, and a bypass choke in the second passage.

Figure 2:
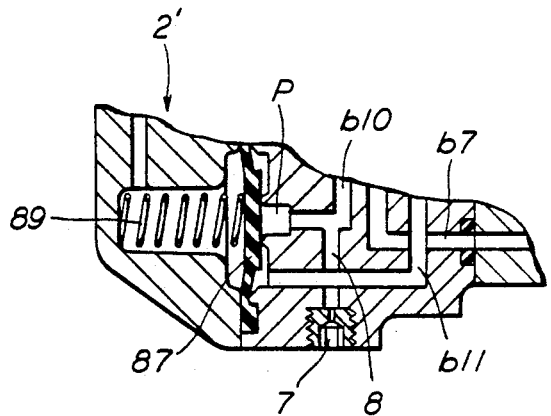

The foregoing objectives and other objects and attendant advantages of the invention will become apparent from the following more detailed explanation when considered in accordance with the accompanying drawings in which:

FIG. 1 is a partial diagrammatic view of an ABDW type Freight Brake Control Valve Device showing the well-known accelerated application valve portion specifically designed for use therewith in providing a continuous quick service function; and FIG. 2 is a fragmentary diagrammatic view of the accelerated application valve of FIG. 1 showing a modification thereof in accordance with the present invention, in order to obtain an intensified continuous quick service function.

DESCRIPTION AND OPERATION

Referring now to FIG. 1 of the drawings, a conventional ABDW type Control Valve emergency portion 1 is shown comprising an accelerated application valve 2 that includes a supply valve 84, a diaphragm type control piston 86 that operates supply valve 84 via a stem 84a, a diaphragm check valve 87, and an exhaust check valve 88. Emergency portion 1 further comprises a diaphragm type emergency piston 60 that carries in its stem a graduating valve 61.

As is well-known, stabilization of the emergency piston during service braking is obtained by reducing the quick action chamber pressure effective in chamber Q on one side of the emergency piston at a rate sufficient to balance the brake pipe pressure reduction in chamber A on the opposite side of emergency piston 60, so long as the rate remains below an emergency rate. The controlled reduction of this quick action chamber pressure is provided by graduating valve 61, as emergency piston 60 finds a steady static position in the "breathing" zone between release and emergency application positions. In this "breathing" zone, the quick action chamber pressure is vented from the seat of graduating valve 61 to atmosphere via passage v2, a control chamber D within the area of control piston 86 bounded by annular valve seat 4, breather choke 92, a passage v5, exhaust check valve 88 and exhaust passage EX. Breather choke 92 creates a back pressure in control chamber D that acts on piston 86 in opposition to the bias force exerted by a control spring 85. When this pressure in chamber D is sufficient to overcome the bias force of control spring 85, control piston 86 is lifted slightly off its seat 4, thereby exposing the entire area of control piston 86 to the back pressure effective in chamber D. This significantly increases the actuating force urging movement of piston 86 to application position in order to positively unseat supply valve 84. In application position, control piston 86 also engages an annular valve seat 5 defining a chamber E within the area of piston 86 on the side opposite chamber D. Brake pipe air in passage b7 is admitted via a supply choke 83 and passage b10 to bulb volume 6 and cavity P under the seated diaphragm check valve 87.

Concurrently, exhaust check valve 88 operates at nominally 10 psi to insure that sufficient brake pressure is retained in control chamber D for normal valve operation during a service brake pipe reduction. When control signal pressure in passage v5 and cavity J exceeds the spring bias of exhaust check valve 88, the valve will open to exhaust the control signal pressure via passage EX and thereby prevent the buildup of excessive back pressure in passage v5 behind breather choke 92.

In the open position of supply check valve 84, brake pipe air is admitted into bulb volume 6 and thus provides a small but finite drop locally in brake pipe pressure. When the bulb pressure increases to a value sufficient to overcome the bias spring normally maintaining closure of diaphragm check valve 87, the valve will become unseated and expose the entire diaphragm area to the pressure in cavity P. This will cause the diaphragm check valve 87 to snap fully open and connect the air in bulb volume 6 to cavity E via passages b10 and b11. As the pressure thus developed in chamber E acting on the seat area of control piston 86, supplemented by the bias force of control spring 85, overcomes the opposing force of back pressure effective in control chamber D, the control piston 86 is forced off its seat 5. This results in the entire area of control piston 86 being exposed to the bulb pressure in chamber E, which produces a significant increase in force to positively reset control piston 86 to its release position. The opening force on supply valve 84 is thus removed to allow return spring 90 to reseat the supply valve and accordingly cut off brake pipe air from bulb 6 to terminate a first phase of cyclic operation of accelerated application valve 2, during which a quick service reduction of brake pipe pressure is provided. It will be appreciated that the bulb pressure at which diaphragm check valve 87 is set to open determines how much brake pipe air is removed during this phase of each cycle of operation.

The final phase of the operating cycle is initiated when diaphragm piston 86 is reset to its initial release position, in which diaphragm piston 86 is disengaged from seat 5. This allows bulb pressure to blowdown through the open diaphragm check valve 87, bulb exhaust choke 93, and exhaust passage EX. When the bulb pressure drops to a relatively low value, as determined by the diaphragm area of control piston 86 and the diaphragm check valve return spring 89, diaphragm check valve 87 becomes seated to terminate any further blowdown of bulb pressure. Pressure in chamber E continues to vent via the bulb exhaust choke 93, completing the final phase of the operating cycle.

Depending on the rate of brake pipe reduction in effect, and thus the level of control pressure in chamber D acting on control piston 86, the cycling rate will vary, being faster at higher rates and slower at lower rates. It will be appreciated, therefore, that the amount of brake pipe air that is vented locally by accelerated application valve 2 increases with the cycling rate, since the amount of bulb air vented each cycle is fixed.

The present invention is a modified ABDW type accelerated application valve 2', which provides a low-cost solution to the desideratum for an intensified quick service function, particularly for use with longer railroad freight cars in use today.

This modification results in a totally different operating characteristic of accelerated application valve 2', yet is accomplished simply by the addition of a bulb bypass choke 7 in a passage 8 that leads from existing passage b10 to atmosphere, as shown in FIG. 2. As will now be explained, the above-referred to operating characteristic provided by the present invention is a dual mode operation in which accelerated application valve 2' operates in a steady state mode during conditions of relatively high control signal pressure (high rates of brake pipe pressure reductions) and operates cyclically during conditions of relatively low control signal pressure (low rates of brake pipe pressure reductions).

With control piston 86 in release position, as shown, back pressure in control chamber D builds up until the opposing force of control spring 85 and any residual pressure existing in chamber E is overcome as previously explained. When this occurs, the resultant differential force causes the control piston 86 to snap to application position, opening supply valve 84. Brake pipe pressure in passage b7 is supplied via choke 83 to passage b10 leading to bulb 6 and cavity P where it acts on diaphragm check valve 87 in opposition to spring 89. At the same time, the pressure supplied to bulb 6 and cavity P is vented to atmosphere via passage 8 and bypass choke 7. It will be appreciated, therefore, that in venting brake pipe pressure to atmosphere concurrently with the filling of bulb 6, a greater bite of brake pipe pressure is taken per unit of time than is obtained by the filling of bulb 6 alone.

When the bulb pressure builds up in cavity P sufficiently to open diaphragm check valve 87, bulb pressure is connected to chamber E within the seat area of control piston 86 opposite the entire area of chamber D that is subject to the control pressure signal. The piston seat areas and the opening pressure of diaphragm check valve 87 are selected so that within a relatively wide range of control pressures, the differential force acting on control piston 86 is not reversed and control piston 86 is not reset, but instead is maintained in its application position. Consequently, accelerated application valve 2' assumes a steady state mode of operation in which supply valve 84 remains open to continually allow brake pipe pressure to bleed to atmosphere via bulb bypass choke 7 following the filling of bulb 6. During this time, the flow capacity via bypass choke 7 is more restrictive than the flow capacity via supply choke 83, so that bypass choke 7 governs the degree of local quick service activity. It will be appreciated, therefore, that in providing a steady state mode of operation in response to relatively high rates of reduction in brake pipe pressure, an intensified quick service reduction of brake pipe pressure is obtained not only by exhausting brake pipe pressure locally to supplement the bulb filling during the initial phase of operation, but by extending the initial phase so that the supplemental exhausting of brake pipe pressure is constant, so long as the reduction in brake pipe pressure remains at a relatively high rate.

When the control pressure signal effective in chamber D decreases to a value that is below the so-called high pressure range, i.e., to a relatively low value, or when the initial control pressure is at a relatively low value, due to a relatively low rate of reduction in brake pipe pressure, bulb pressure connected to chamber E, upon opening of diaphragm check valve 87, will be sufficient to reverse the differential pressure force acting on control piston 86. This will result in control piston 86 being snapped back to release position in which supply valve 83 is closed to terminate further exhaust of brake pipe pressure via bypass choke 7, and at the same time vent bulb 6 and chamber E to atmosphere via exhaust choke 93 and exhaust passage EX. Consequently, a cycling mode of operation will be instigated similar to the cyclic operation of the accelerated application valve 2 without the modification of the present invention. Since exhaust choke 7 is provided, in accordance with the present invention, however, even in the cyclic mode of operation, an intensified quick service function is realized during the initial phase of the operating cycle. In application position of supply valve 83, brake pipe air is supplied to bulb 6, while concurrently being exhausted via bypass choke 7. Bypass choke 7 is sized relative to supply choke 83, such that a pressure buildup will be assured of developing in bulb 6 and cavity P sufficient to open diaphragm check valve 87 to reset control piston 86 and thereby effect the cyclic action of accelerated application valve 2'.

In thus modifying the operational characteristic of accelerated application valve 2' to obtain a steady state operating mode, not only is the local reduction of brake pipe pressure increased per unit of time, but also the service life of the several parts otherwise subject to wear due to continuous cycling is extended.

Moreover, modified accelerated application valve 2' may be conveniently converted from a dual mode operating characteristic back to a pure cyclic operating mode, if desired, by simply removing choke 7 from passage 8 and replacing it with a plug, not shown. This might be desirable in the case of the accelerated application valve be employed on a standard or short car, as opposed to the longer cars in service today and for which the present invention is ideally suited.

I claim:

1. An accelerated application valve for use in combination with a control valve of a railway car having a brake pipe, said control valve being operable responsive to a reduction of fluid pressure carried in said brake pipe to effect a brake application on said railway car, said accelerated application valve comprising:
   (a) a first control chamber to which a first control fluid under pressure is connected in response to operation of said control valve;
   (b) a second control chamber;
   (c) a first passage via which fluid under pressure is connected from said brake pipe to said second chamber;
   (d) a control piston reciprocably operable between a release position and an application position, said control piston being operable to said application position in response to said first control fluid under pressure acting on one side thereof;
   (e) a supply valve in said first passage having a normally closed position and an open position, said control piston in said application position effecting operation of said supply valve to said open position, wherein fluid under pressure flows to said second chamber, a side of said control piston opposite said one side being subject to fluid under pressure in said second chamber for urging said control piston toward said release position;
   (f) check valve means in said first passage for delaying flow of fluid under pressure to said second control chamber following opening of said supply valve, said control piston being accordingly reset to said release position preparatory to a subsequent cycle of operation so long as said first control fluid under pressure is less than a threshold value;
   (g) a bypass passage connecting said first passage to atmosphere at a location between said supply valve and said second chamber to thereby effect a supplemental reduction of fluid under pressure in said brake pipe when said supply valve is in said open position;
   (h) a control choke in said bypass passage; and
   (i) a supply choke in said first passage upstream of said supply valve, said control choke being more restrictive than said supply choke to thereby establish said threshold value above which said control piston is prevented from being reset to thereby cause said accelerated application valve to revert from a cyclic mode of operation to a steady state mode of operation.

2. An accelerated application valve device, as recited in claim 1, further comprising:
   (a) a first annular valve seat in said first control chamber with which said control piston is engageable in said release position and from which said control piston is disengaged in said application position; and
   (b) a second annular valve seat in said second control chamber with which said control piston is engageable in said application position and from which said control piston is disengageable in said release position.

3. An accelerated application valve device, as recited in claim 2, wherein said first valve seat and said second valve seat have diameters of the same dimension.

4. An accelerated application valve device, as recited in claim 2, wherein said opposite side of said control piston in said application position thereof is separated by said second valve seat into an inner pressure area and an outer pressure area.

5. An accelerated application valve device, as recited in claim 4, wherein said first passage is connected to said second control chamber at said inner pressure area.

6. An accelerated application valve device, as recited in claim 5, further comprising:
   (a) an exhaust passage connecting said second chamber to atmosphere at said outer pressure area; and
   (b) an exhaust choke in said exhaust passage.

7. An accelerated application valve device, as recited in claim 2, wherein said one side of said control piston is separated by said first valve seat into an inner pressure area and an outer pressure area when said control piston is in said release position.

8. An accelerated application vale device, as recited in claim 7, further comprising:
   (a) a control passage via which said first control pressure is connected to said first control chamber;
   (b) a first exhaust passage connecting said first control chamber to atmosphere at said inner pressure area; and
   (c) a breather choke in said first exhaust passage.

9. An accelerated application valve device, as recited in claim 8, wherein said control passage and said first exhaust passage are connected to said first control chamber at said inner pressure area.

10. An accelerated application valve device, as recited in claim 9, further comprising:
    (a) a second exhaust passage connecting said first control chamber to atmosphere at said outer pressure area; and
    (b) an exhaust choke in said second exhaust passage.

11. An accelerated application valve device, as recited in claim 1, wherein a connection of said bypass passage with said first passage is at a location between said supply valve and said check valve means.

12. An accelerated application valve device, as recited in claim 11, further comprising
    a quick service bulb in said first passage between said supply valve and said bypass passage.

* * * * *